United States Patent
Prevost

(10) Patent No.: US 6,505,696 B1
(45) Date of Patent: Jan. 14, 2003

(54) RADIATOR SYSTEM FOR USE ON AUTOMOBILES HAVING REAR ENGINES

(76) Inventor: Clemon P. Prevost, 506 N. Pine Rd., Texas City, TX (US) 77590

( * ) Notice: Subject to any disclaimer, the term of this patent is extended or adjusted under 35 U.S.C. 154(b) by 45 days.

(21) Appl. No.: 09/799,298

(22) Filed: Mar. 5, 2001

(51) Int. Cl.[7] .............................................. B60K 11/04
(52) U.S. Cl. .................... 180/68.4; 180/68.4; 180/68.6; 180/69.2; 123/41.31; 123/41.43
(58) Field of Search ............................... 180/68.4, 68.1, 180/68.2, 68.6, 69.2, 69.24, 69.21; 123/41.31, 41.43

(56) References Cited

U.S. PATENT DOCUMENTS

| | | | | |
|---|---|---|---|---|
| 4,825,815 A | * | 5/1989 | Turner | 123/41.49 |
| 4,828,017 A | * | 5/1989 | Watanabe et al. | 165/41 |
| 4,889,382 A | * | 12/1989 | Burst et al. | 180/68.1 |
| 4,966,408 A | * | 10/1990 | Yura | 180/68.4 |
| 5,042,870 A | * | 8/1991 | Yura | 180/903 |
| 5,078,223 A | * | 1/1992 | Ishiwatari et al. | 123/41.49 |
| 5,103,774 A | * | 4/1992 | Hirata et al. | 123/41.1 |
| 6,092,616 A | * | 7/2000 | Burris et al. | 180/68.1 |

FOREIGN PATENT DOCUMENTS

| | | | | |
|---|---|---|---|---|
| FR | 2616403 A1 | * | 6/1987 | B62D/35/00 |
| JP | 3-5241 | * | 3/1991 | B60K/11/04 |

OTHER PUBLICATIONS

Oil Cooling Guide Porsche, Mocal, BAT Inc.*

* cited by examiner

Primary Examiner—Brian L. Johnson
Assistant Examiner—J. Allen Shriver
(74) Attorney, Agent, or Firm—C. James Bushman; Browning Bushman P.C.

(57) ABSTRACT

A radiator system for mounting on the engine hood of an automobile having a rear engine comprising a generally panel-type radiator, a support for holding the radiator in a generally horizontal disposition and for securing the radiator to the engine hood, an inlet conduit for transferring heated engine coolant from the engine into the radiator, and an outlet conduit for transferring cooled engine coolant from the radiator to the engine.

11 Claims, 4 Drawing Sheets

RADIATOR SYSTEM FOR USE ON AUTOMOBILES HAVING REAR ENGINES

BACKGROUND OF THE INVENTION

1. Field of the Ivention

The present invention relates to radiator systems for use with automobiles having rear engines and, more particularly, to a radiator system of such an automobile that can be mounted externally on the engine hood.

2. Description of the Prior Art

Notable among cars having an engine mounted in the rear is the Porsche, such as, for example, the Porsche model known as the Carrera. These and similar rear-engine sports cars have near fanatical owner allegiance because of their high speed and handling capabilities; however, many such owners desire to have larger, more powerful engines than those with which cars such as the Porsche Carrera come equipped. Accordingly, it is not uncommon for the owner of a Porsche Carrera to remove the factory supplied engine and replace it with a higher performance engine, such as, for example, the so-called LS1 engine, manufactured by the Chevrolet division of General Motors primarily for use in Corvettes; however, this higher performance carries with it the need for a conventional water-type radiator system to cool the engine.

Heretofore, because of the necessity for using a conventional radiator, in order to swap out a factory Porsche engine in favor of a higher performance engine, such as the LS1 engine, it has been necessary to mount the radiator of the engine in the trunk, which in the case of a Porsche-type automobile is at the front. There are several disadvantages to this approach. The main disadvantage is the fact that the front end of the car has to be rather extensively modified. This typically involves a modification of the trunk and the front body panel beneath the front bumper, relocation of the battery compartment, and forming two compartments out of the gas tank to make room for the front-mounted radiator. Such extensive modifications diminish the authenticity of the car. This type of modification also necessitates that water hoses be run from the radiator, which is mounted in the front trunk, to the engine, which is mounted in the rear engine compartment.

Accordingly, a radiator system that could be installed on the engine hood, could be virtually concealed, and would require minimal, easily repairable modifications to the hood would be greatly desired.

SUMMARY OF THE INVENTION

It is therefore an object of the present invention to provide a radiator system for mounting on the engine hood of an automobile having a rear engine.

Another object of the present invention is to provide such a radiator system that does not detract from the aesthetics of the automobile.

Still a further object of the present invention is to provide such a radiator system that requires minimal and easily repairable modifications to the hood.

The above and other objects of the present invention will become apparent from the drawings, the description given herein, and the appended claims.

The present invention provides a radiator system for mounting on the engine hood of an automobile having a rear engine comprising a panel-type radiator and a support for holding the radiator in a generally horizontal disposition and for securing the radiator to the engine hood. There is an inlet coolant conduit, such as a water hose, for transferring heated engine coolant from the engine into the radiator and an outlet conduit, such as a water hose, for transferring cooled engine coolant from the radiator to the engine. Optionally, there is an electrically operated fan disposed adjacent the radiator for moving air through the radiator.

DESCRIPTION OF THE PREFERRED EMBODIMENTS

Figure 1:
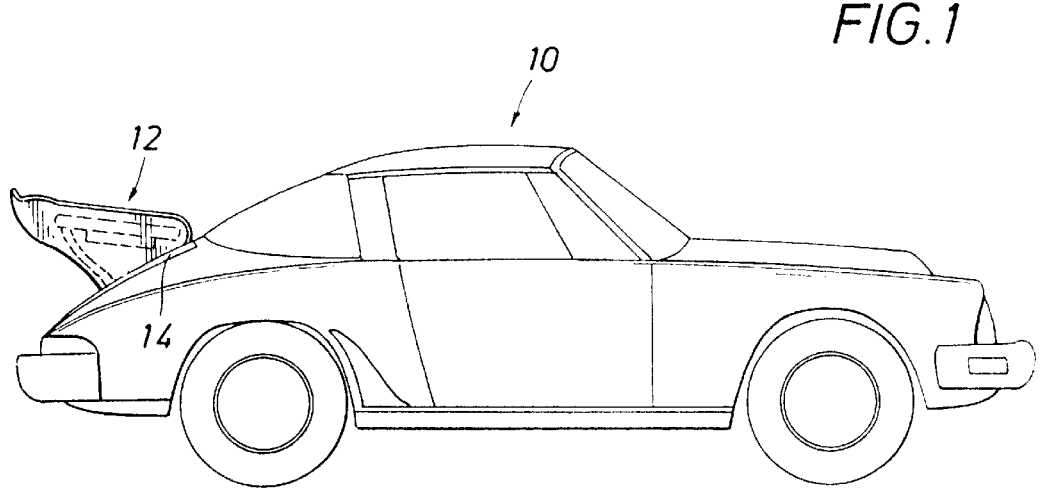
FIG. 1 is a perspective view of an automobile of the rear engine type showing the radiator assembly of the present invention mounted thereon.
Figure 2:
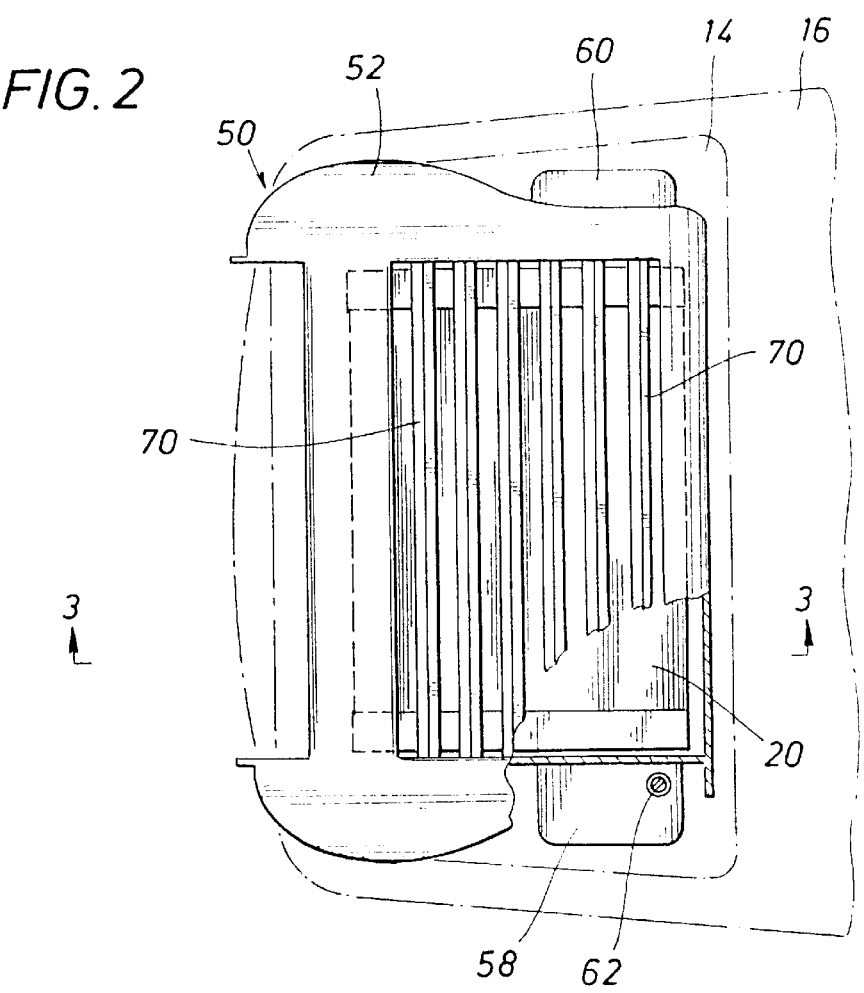
FIG. 2 is a top, plan view showing one embodiment of the radiator system of the present invention.
Figure 3:
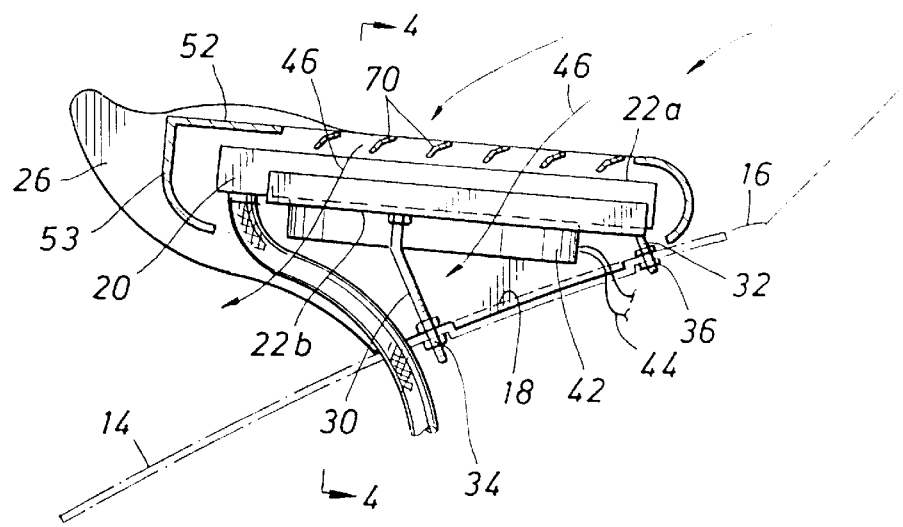
FIG. 3 is a cross-sectional view taken along the lines 3—3 of FIG. 2.

While the present invention will be described with reference to the use of the radiator system of the present invention on a Porsche Carrera, it is to be understood that it is not so limited and can be used with any rear engine automobile wherein it is desired to have a liquid coolant to cool the engine. With reference then to FIG. 1, there is shown an automobile, indicated as 10, of the rear engine type. As depicted, automobile 10 generally resembles a Porsche Carrera and is provided with an externally mounted radiator system, shown generally as 12, and described more fully hereinafter. As can be seen from FIG. 1, the radiator system 12 is mounted on the engine compartment cover or hood 14. With reference to FIG. 2, it can be seen that the rear panel 16 of the automobile 10 is provided with a hinged engine compartment cover or hood 14, hood 14 having spaced apart recesses 18 (see FIG. 3) for a purpose to be described hereinafter. A panel-type radiator 20 of a conventional type having an upper finned surface 22a and a lower finned surface 22b (see FIG. 3) and including one or more cores is secured between a first side beam 26 and a second side beam 28 by welding or any other suitable means to rigidly secure radiator 20 to the side beams 26 and 28. Side beams 26 and 28, which can conveniently be made from angle iron, are each in turn connected to connector rods 30 and 32, connector rod 30, as shown in FIG. 3, being somewhat longer than connector rod 32. Connection between beams 26 and 28 and connectors rods 30 and 32 can be accomplished by welding or in any other fashion. Connector rods 30 and 32 have a threaded portion that extends through bores in trunk 14, the threaded portions of connector rods 30 and 32 permitting connector rods 30 and 32 to be securely fastened to trunk 14 by virtue of nut assemblies 34 and 36, respectively. It will thus be seen that beams 26, 28 and connector rods 30, 32 form a support that holds radiator 20 in a generally horizontal disposition and secures radiator 20 to engine hood 14.

As is conventional, radiator 20 is provided with inlet hose 38 and outlet hose 40 whereby heated engine coolant can enter radiator 20 through hose 38 and cooled engine coolant can be returned to the engine through hose 40. Mounted below radiator 20 is an electrical fan 42 with leads 44 extending through trunk 14 to a suitable electrical power source (not shown). As is well understood by those skilled in the art, fan 42 serves to move air through the fins of radiator 20 and over the core elements, in the embodiment shown, fan 42 serving to pull air in the direction shown by arrows 46.

Mounted to hood 14 is a spoiler shown generally as 50, spoiler 50 comprising a generally horizontally disposed wing 52 and first and second, spaced side flanges 54 and 56, side flanges 54 and 56 being connected to the underside of wing 52. Distal wing 52, side flanges 54 and 56 are connected to mounting pads 58 and 60, respectively, mounting pads 58 and 60 being received in recesses 18 of trunk 14. As is known to those skilled in the art, many cars are equipped with spoilers mounted on the trunk in a fashion similar to what has been described above in that mounting pads, e.g., 58 and 60, are received in recesses in the trunk, e.g., trunk 14. The recesses, e.g., recesses 18, have a profile complementary to the shape of pads 58 and 60 such that when pads 58 and 60 are received in the recesses, the mounting pads are substantially flush with hood 14. Mounting pads 58 and 60 are secured to hood 14 by means of nut and bolt assemblies 62, one of which is shown in FIG. 2.

As can be seen in FIGS. 1 and 3, spoiler 50 substantially conceals radiator 20 and its associated parts from view. In this regard, spoiler 50 includes a rear wall 53 that extends downwardly from the back edge of wing 52. Thus, when viewed either from the side or the rear of automobile 10, virtually the only parts of radiator 20 and its associated components that are visible are portions of the fan 42, hoses 38, 40, and, to a lesser extent, connecting rods 30, 32.

Spoiler 50 serves not only to substantially conceal radiator 20 and its associated components, but also acts to divert air flow onto the upper surface 22a of radiator 20 to aid in cooling efficiency. To this end, wing 52 is provided with a series of louvers 70 disposed between flanges 26 and 28, louvers 70 being angled, as best shown in FIG. 3, so as to divert air flow in the direction of the arrows in FIG. 3 against the top surface 22a of radiator 20.

Figure 4:
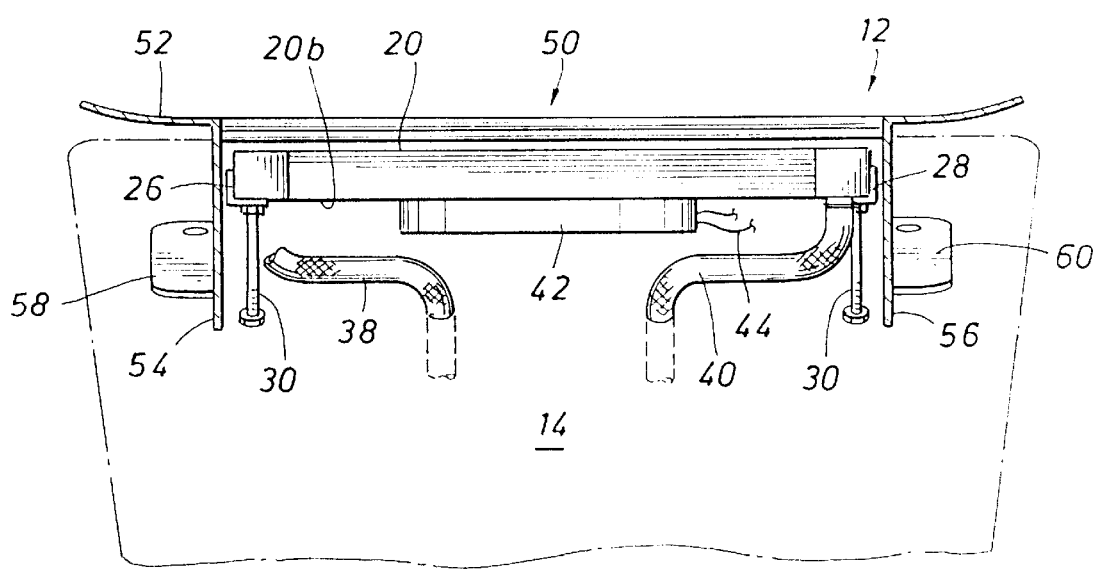
FIG. 4 is a view taken along the lines 4—4 of FIG. 3.
Figure 5:
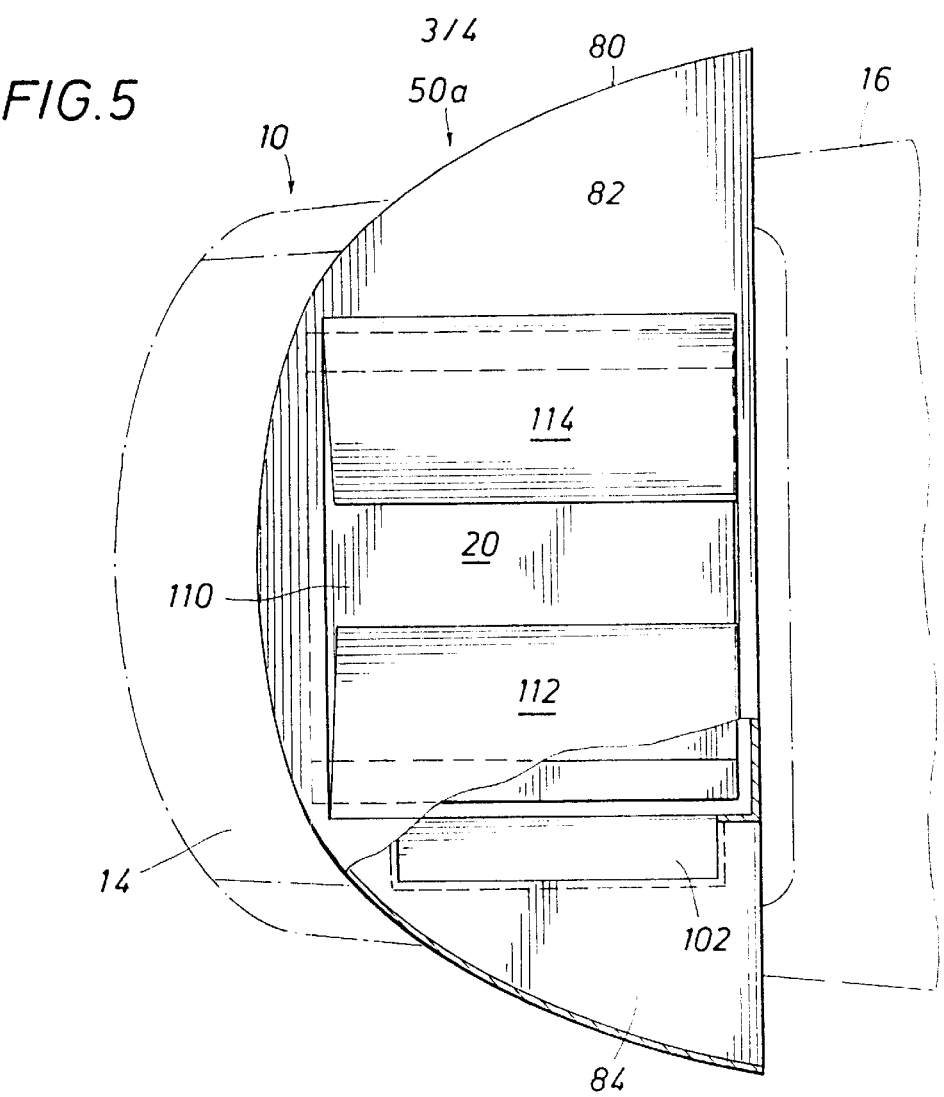
FIG. 5 is a top, plan view showing another embodiment of the radiator system of the present invention.
Figure 6:
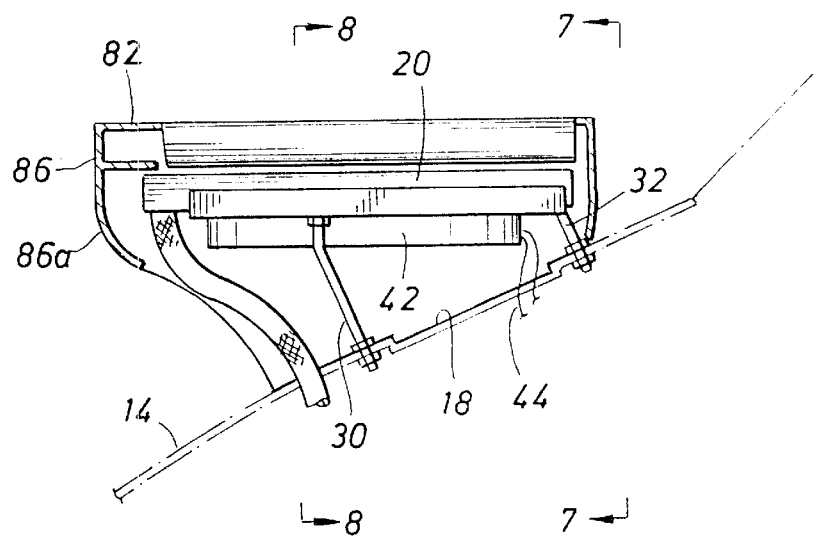
FIG. 6 is a view taken along the lines 6—6 of FIG. 5.
Figure 7:
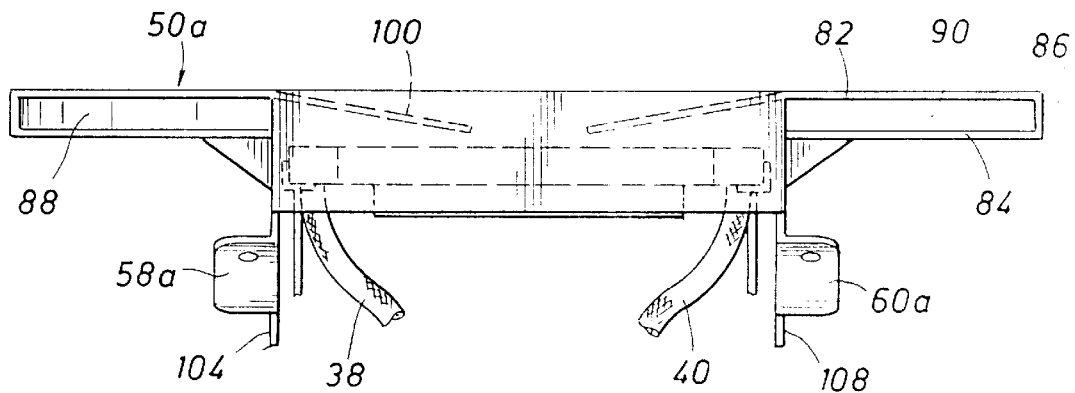
FIG. 7 is a view taken along the lines 7—7 of FIG. 6.

Reference is now made to FIGS. 5–8, showing another embodiment of the radiator system of the present invention. The radiator system shown in FIGS. 5–8 differs from that shown in FIGS. 2–4 in the design of the spoiler. Spoiler 50a has a generally horizontally extending wing 80 having an upper wall 82 and a lower wall 84 connected by a peripherally extending side wall 86. Upper wall 82, lower wall 84, and side wall 86 cooperate to form air scoops 88 and 90, which, as seen in FIG. 5, extend laterally outwardly on either side of automobile 10 such that when automobile 10 is in forward motion, air is picked up by scoops 88, 90. Air scoops 88 and 90 have throat portions 88a and 90a, respectively, that open into what can be characterized as an air plenum 100 in which radiator 20 is disposed. Throat 88a is formed by wall section 102, which is connected at its upper end to lower wall 84, and at its lower end, to side flange 104, which in turn is connected to a mounting pad 58a. In like fashion, throat 90a is formed by a wall section 106, which is connected at its upper end to lower wall 84, and at its lower end, to side flange 108, side flange 108 being connected to mounting pad 60a. As can be best seen in FIG. 8, wall sections 102 and 106 are angled downwardly from lower wall 84. Accordingly, it can be seen that air drawn into scoops 88 and 90 will be diverted by wall sections 102 and 106 through throats 88a and 90a into the plenum 100, which generally surrounds radiator 20, to aid in the cooling efficiency of radiator 20. More specifically, wall sections 102 and 104 divert air over the tanks of the radiator, which, as well known to those of skill in the art, are located at opposite sides of the radiator, the tanks being indicated at 21a and 21b.

Figure 8:
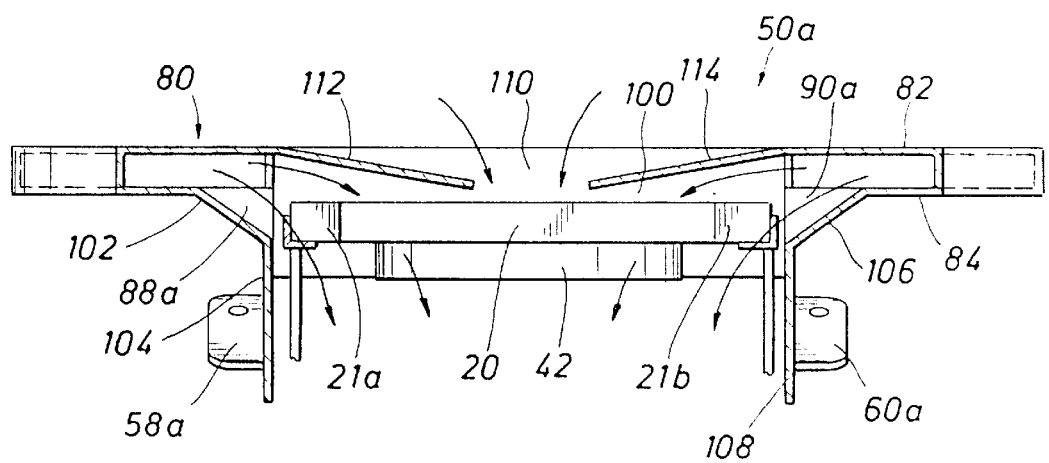
FIG. 8 is a view taken along the lines 8—8 of FIG. 6.

As best seen in FIGS. 5 and 8, top wall 82 has an opening or mouth 110 defined by first and second diverter plates 112 and 114, opening 110 being generally centrally disposed between the opposed, lateral sides of spoiler 50a and opening into air plenum 100. As in the case of wall sections 102 and 104, diverter plates 112 and 114 are angled downward from upper wall 82. Accordingly, air flow passing through scoops 88, 90 when the automobile is in forward motion will be diverted down by diverter plates 112 and 114 into plenum 100 and, more specifically, onto the upper surface of radiator 20. Air flow through spoiler 50a onto radiator 20 is indicated by the various arrows shown in FIG. 8. Mount 110 allows air to be pulled through radiator 20 by fan 42 when the engine is idling.

As does spoiler 50, spoiler 50a substantially conceals radiator 20 and its component parts. In this regard, note that peripheral wall 86 has a downward extension 86a that generally spans the distance between, and is connected to, flanges 104 and 108. Indeed, extension 86a can have side sections that are connected to side flanges 104 and 108 such that hoses 38 and 40 and connecting rods 30 and 32 can be completely concealed such that even when viewed from the rear of the automobile, only the lowermost portion of fan 42 is visible, and then only when the viewer stoops from an upright, standing position.

The foregoing description and examples illustrate selected embodiments of the present invention. In light thereof, variations and modifications will be suggested to one skilled in the art, all of which are in the spirit and purview of this invention.

What is claimed is:

1. A radiator system for mounting on the engine hood of an automobile having a rear engine comprising:
   a panel-type radiator;
   a support for positioning said radiator above said engine hood and for securing said radiator to said engine hood;
   an inlet conduit for transferring heated engine coolant from said engine into said radiator; and an outlet conduit for transferring cooled engine coolant from said radiator to said engine.

2. The radiator system of claim 1, including an electrically operated fan disposed adjacent said radiator for moving air through said radiator.

3. The radiator system of claim 1 wherein said inlet and outlet conduits extend through said engine hood.

4. The radiator system of claim 1, further including a spoiler mounted on said engine hood, said spoiler serving to substantially conceal said radiator system.

5. The radiator system of claim 4 wherein said radiator has an upper surface and a lower surface and said spoiler includes air deflectors for directing air onto said upper surface of said radiator when said automobile is moving forward.

6. The radiator system of claim 4 wherein said spoiler includes spaced, first and second, generally vertically disposed side flanges and a generally horizontally disposed wing interconnected to said first and second side flanges.

7. The radiator system of claim 6 wherein said wing is provided with a plurality of louvers, said louvers extending through said wing and being angled so as to direct air flow toward said upper surface of said radiator when said automobile is moving forward.

8. The radiator system of claim 6 wherein there is a first mounting pad connected to said first side flange and a second mounting pad connected to said second side flange, and there are first and second recesses in said hood, said recesses forming receiving formations for said first and second mounting pads, respectively.

9. The radiator system of claim 6 wherein said spoiler includes first and second air scoops formed in said wing and extending laterally outwardly from said first and second vertically disposed flanges, respectively, and said wing further includes a top wall with an opening therein, said opening being formed by first and second diverter plates, said first and second diverter plates being angled to direct air flow entering said spoiler through said first and second air scoops onto said upper surface of said radiator.

10. The radiator system of claim 1 wherein said radiator includes a first side and a second side, said first side being secured to a first side beam, said second side being secured to a second side beam, and there are first and second connector rods extending between said first side beam and said hood, and third and fourth connector rods extending between said second side beam and said hood.

11. The radiator system of claim 5, including an electrically operated fan disposed adjacent said lower surface of said radiator for moving air through said radiator.

* * * * *